(12) United States Patent
Eichenberger et al.

(10) Patent No.: US 8,266,587 B2
(45) Date of Patent: Sep. 11, 2012

(54) METHOD USING SLP PACKING WITH STATEMENTS HAVING BOTH ISOMORPHIC AND NON-ISOMORPHIC EXPRESSIONS

(75) Inventors: Alexandre E. Eichenberger, Chappaqua, NY (US); Kai-Ting Amy Wang, North York (CA); Peng Wu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/964,324

(22) Filed: Dec. 26, 2007

(65) Prior Publication Data

US 2009/0171919 A1 Jul. 2, 2009

(51) Int. Cl.
G06F 9/44 (2006.01)
(52) U.S. Cl. ...................................................... 717/119
(58) Field of Classification Search ............ 717/114–119
See application file for complete search history.

(56) References Cited

U.S. PATENT DOCUMENTS

| | | |
|---|---|---|
| 7,032,215 B2 | 4/2006 | Harrison, III et al. |
| 2005/0273769 A1 | 12/2005 | Eichenberger et al. |
| 2005/0273770 A1 | 12/2005 | Eichenberger et al. |
| 2005/0283769 A1 | 12/2005 | Eichenberger et al. |
| 2005/0283774 A1 | 12/2005 | Eichenberger et al. |
| 2005/0283775 A1 | 12/2005 | Eichenberger et al. |
| 2007/0011441 A1 | 1/2007 | Eichenberger et al. |
| 2007/0038984 A1 | 2/2007 | Gschwind et al. |
| 2008/0077768 A1* | 3/2008 | Inoue et al. ........................ 712/9 |

OTHER PUBLICATIONS

Nuzman et al., "Auto-Vectorization of Interleaved Data for SIMD", Jun. 2006, ACM, pp. 132-143.*
Larsen et al., "Exploiting Superword Level Parallelism with Multimedia Instruction Sets", 2000, ACM, pp. 145-156.*
Ren et al., "Optimizing Data Permutations for SIMD Devices", 2006, ACM, pp. 118-131.*

* cited by examiner

*Primary Examiner* — Ted T Vo
(74) *Attorney, Agent, or Firm* — Yee & Associates, P.C.; David A. Mims, Jr.

(57) ABSTRACT

Disclosure for using SLP in processing a plurality of statements, wherein the statements are associated with an array having a number of array positions, and each statement includes one or more expressions. Expressions are gathered for each of the statements into a structure comprising a single merge stream furnished with a location for each expression. The location for a given expression is associated with one of the array positions. A plurality of expressions are selectively identified and SLP packing operations are applied to the identified expressions to merge into one or more isomorphic sub-streams. Expressions of the isomorphic sub-streams and other expressions of the single merge stream are combined into a number of input vectors that are substantially equal in length to one another. A location vector is generated that contains the respective locations for all of the expressions in the single merge stream.

26 Claims, 4 Drawing Sheets

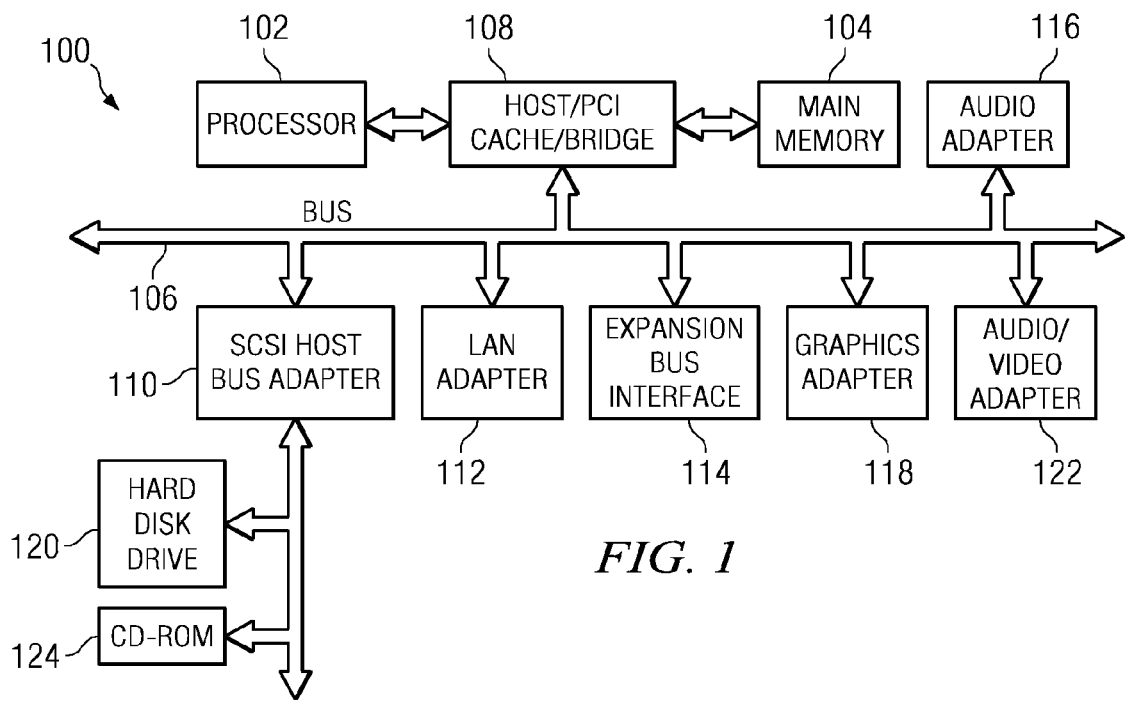

FIG. 2B

```
for (i=0; i<64; i+=1) {
    s1..4:   a[4i+0..4i+3]    = merge-stream (
    b[2i+0]  [0],
    t1*d[2i+0],  [1],
    0.5*(b[2i+1]+c[i]),  [2],
    t1*d[2i+1],  [3]) ;
```
208

```
for (i=0; i<64; i+=1) {
    s1..4:   a[4i+0..4i+3]    = merge-stream (
    b[2i+0],  [0]        MERGED EXPR WITH
                         PROPER LOCATION
                            INFORMATION
    t1*d[2i+0..1],  [1,3],  212
    0.5*(b[2i+1]+c[i]),  [2]);
```
210

FIG. 2C

```
for (i=0; i<64; i+=1) {
    s1..4:   a[4i+0..4i+3]    = merge-stream (
    b[2i+0],     216
    [0],                GATHER PAIRS OF
                        STREAMS WITH ONE
                        ELEMENT EACH
    t1*d[2i+0..1],  [1,3],
    0.5*(b[2i+1]+c[i]),  [2]);   218
```
214

```
for (i=0; i<64; i+=1) {                    224
    s1..4:   a[4i+0..4i+3]    = merge-stream (   226
    permute (b[2i+0], 0.5* (b[2i+1]+c[i]), [0,1], [0,2],
    t1*d[2i+0..1],  [1,3]));
                                     222
```
220

```
for (i=0; i<64; i+=1) {
    s1..4:   a[4i+0..4i+3]    = merge-stream (   224
    permute (b[2i+0], 0.5* (b[2i+1]+c[i]), [0,1], [0,2],
    t1*d[2i+0..1],  [1,3]));
```
228

```
for (i=0; i<64; i+=1) {
   s1..4:   a[4i+0..4i+3]   = permute (
   permute (b[2i+0], 0.5*(b[2i+1]+c[i]), [0,1],
   t1*d[2i+0..1],
   [0, 2, 1, 3]
```
— 230

232

METHOD USING SLP PACKING WITH STATEMENTS HAVING BOTH ISOMORPHIC AND NON-ISOMORPHIC EXPRESSIONS

BACKGROUND OF THE INVENTION

1. Field of the Invention

The invention disclosed and claimed herein generally pertains to a Single Instruction Multiple Data (SIMD) code generation method that uses Superword-Level Parallelism (SLP) in connection with mixed isomorphic and non-isomorphic packed code. More particularly, the invention pertains to a method of the above type that uses a permute operator to combine isomorphic and non-isomorphic expressions into an aggregated expression, in order to provide a final output stream.

2. Description of the Related Art

It is well known that computer processing speed has increased through the use of parallel processing. One form of parallel processing relies on a SIMD architecture, which processes multiple data packed into a vector register in a single instruction, such as SSE for Pentium, VMX for PPC 970, CELL, and Dual FPU for BlueGene/L. The type of parallelism exploited by SIMD architecture is referred to as SIMD parallelism, and the process of automatically generating SIMD operations from sequential computation is referred to as extracting SIMD parallelism.

An application that may take advantage of SIMD is one where the same value is being added (or subtracted) to a large number of data points. In a SIMD processor, the data is understood to be in blocks, and a number of values can all be loaded simultaneously. Typically, SIMD systems include only those instructions that can be applied to all of the data in one operation. Thus, if a SIMD system loads eight data points at once, an add operation that is applied to the data will be applied to all eight values at the same time. SIMD instructions can include add, load, multiply and store instructions.

One approach for extracting SIMD parallelism from input code is the Superword Level Parallelism (SLP) algorithm. The SLP approach packs multiple isomorphic statements that operate on data, located in adjacent memory positions, into one or more SIMD operations. The terms "packing" and "pack", as used herein, refer to combining statements that can be scheduled together for processing. Two statements are "isomorphic" with respect to each other if each statement performs the same set of operations in the same order as the other statement, and the corresponding memory operations access adjacent or consecutive memory locations.

The SLP procedure is illustrated by the following statements of Table 1 for the loop or looped iterations (i=0; i<64; i+=1):

TABLE 1

Statements with Isomorphic Relationship a[3i + 0] = b[3i + 0] * c[3i + 0]
a[3i + 1] = b[3i + 1] * c[3i + 1]
a[3i + 2] = b[3i + 2] * c[3i + 2]

The statements in Table 1 are isomorphic in relation to each other because each statement performs two load operations, one multiply operation, and one store operation in the same order. Moreover, the corresponding memory operations in these statements (or any statements with an isomorphic relation) must access operations that are either adjacent or identical. For example, the memory access of a[3i+0] is adjacent to the memory access of a[3i+1]. Likewise, a[3i+1] is adjacent to a[3i+2]. Similarly, the memory accesses of "b" and "c" are adjacent.

SLP proceeds first by analyzing the alignment of each memory reference in a basic block, and then packs adjacent memory references (e.g., a[3i+0] and a[3i+1], or b[3i+0] and b[3i+1]). After memory references are packed, SLP further packs operations that operate on adjacent data, such as b[3i+0]*c[3i+0] and b[3i+1]*c[3i+1]. The SLP procedure and other SIMD code generation techniques address mostly stride-one memory and computation streams. Generally, a stride-one memory access for a given array is defined as an access in which only consecutive memory locations are touched over the lifetime of the loop.

Current SIMD architectures frequently use Multiple Instruction Multiple Data (MIMD) instructions that perform different computations on different elements of a vector. For instance, the ADDSUBPS instruction in SSE3 (Streaming SIMD Extensions by Intel) performs an add operation on odd elements of input vectors, and a subtract operation on even elements of input vectors. As a result, certain SIMD packing techniques have been developed for use with statements that include non-isomorphic expressions.

In one such technique, wherein each statement in received input code individually has a stride-one stream, an effort is made to identify pairs of expressions X and Y within a basic block of the input that are semi-isomorphic with respect to one another. X and Y are defined to be semi-isomorphic with respect to each other if they satisfy at least one condition, such as X and Y are identical, X and Y are literals, X and Y are loaded from adjacent memory locations, or X and Y are stored to adjacent memory locations and the stored values are semi-isomorphic with respect to each other. As another example, an expression is semi-isomorphic in relation to another expression, when one expression performs the same operations and in the same order as the other expression, with the exception that at least one mathematical operation is different. For example, one expression will use a "+" operation in lieu of a "−" operation in the other expression.

Another technique, referred to as SLP with interleaved data, receives statements that have non-isomorphic expressions, and then looks at all the inputs of the statement that have a given stride. Sub-streams of received data are scattered, and non-isomorphic computations are made using these sub-streams. This technique, however, is not as efficient as it might be.

It would thus be desirable to provide a new approach for using SLP in the presence of mixed isomorphic and non-isomorphic packed code or statements, wherein efficiency is significantly improved over prior art techniques.

SUMMARY OF THE INVENTION

A computer implemented method is provided for using SLP in processing a plurality of statements, wherein the statements are associated with an array having a number of array positions, and each statement includes one or more expressions. The method includes the step of gathering expressions for each of the statements into a structure comprising a single merge stream, the merge stream being furnished with a location for each expression, wherein the location for a given expression is associated with one of the array positions. The method further comprises selectively identifying a plurality of expressions, and applying SLP packing operations to the identified expressions, in order to merge respective identified expressions into one or more isomorphic sub-streams. The method further comprises selectively combining the expressions of the isomorphic sub-streams, and other expressions of the single merge stream, into a number of input vectors that are substantially equal in length to one another. A location vector is generated that contains the respective locations for all of the expressions in the single merge stream. The method further comprises generating an output stream that comprises the expressions of the input vectors, wherein the expressions are arranged in the output stream in an order determined by the respective locations contained in the location vector.

BRIEF DESCRIPTION OF THE DRAWINGS

FIG. 1 is a block diagram showing a data processing system that may be used in implementing embodiments of the invention.

FIGS. 2A-2D are schematic diagrams illustrating respective steps of an embodiment of the invention.

FIG. 4 is a schematic diagram illustrating a compiler for use in connection with an embodiment of the invention.

DETAILED DESCRIPTION OF THE PREFERRED EMBODIMENT

Figures 2D, 4:
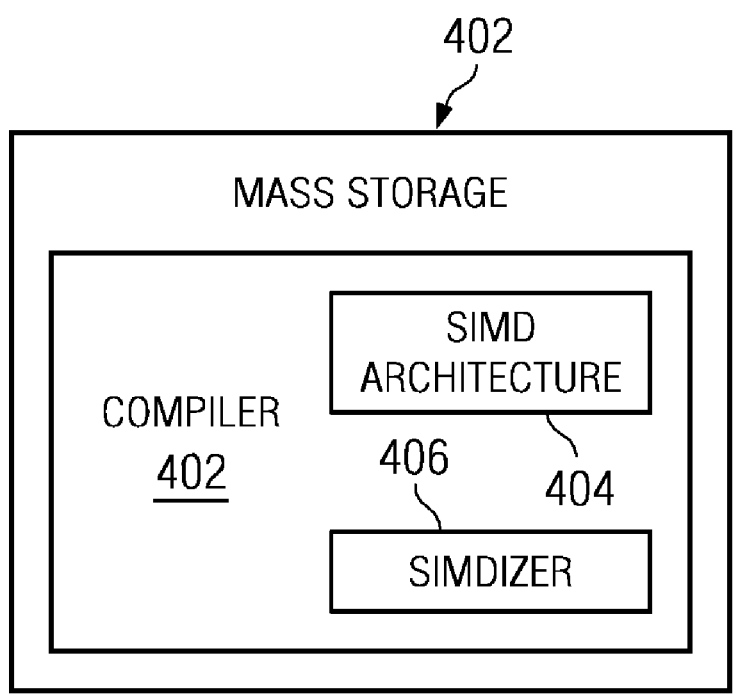

Referring to FIG. 1, there is shown a block diagram of a generalized data processing system 100 which may be used in implementing embodiments of the present invention. Data processing system 100 exemplifies a computer, in which code or instructions for implementing the processes of the present invention may be located. Data processing system 100 usefully employs a peripheral component interconnect (PCI) local bus architecture, although other bus architectures such as Accelerated Graphics Port (AGP) and Industry Standard Architecture (ISA) may alternatively be used. FIG. 1 shows a processor 102 and main memory 104 connected to a PCI local bus 106 through a Host/PCI bridge 108. PCI bridge 108 also may include an integrated memory controller and cache memory for processor 102.

Referring further to FIG. 1, there is shown a local area network (LAN) adapter 112, a small computer system interface (SCSI) host bus adapter 110, and an expansion bus interface 114 respectively connected to PCI local bus 106 by direct component connection. Audio adapter 116, a graphics adapter 118, and audio/video adapter 122 are connected to PCI local bus 106 by means of add-in boards inserted into expansion slots. SCSI host bus adapter 110 provides a connection for hard disk drive 120, and also for CD-ROM drive 124.

An operating system runs on processor 102 and is used to coordinate and provide control of various components within data processing system 100 shown in FIG. 1. The operating system may be a commercially available operating system such as Windows XP, which is available from Microsoft Corporation. Instructions for the operating system and for applications or programs are located on storage devices, such as hard disk drive 120, and may be loaded into main memory 104 for execution by processor 102.

The following set of statements s1-s4 shown by Table 2 can be used to illustrate one embodiment of the invention, for the loop (i=0; i<64; i+=1), wherein "i" is incremented by one at the end of each loop iteration:

TABLE 2

Statements with Mixed Isomorphic and Non-Isomorphic Relationships

S1: $a[4i + 0] = b[2i + 0]$
S2: $a[4i + 1] = t1 * d[2i + 0]$
S3: $a[4i + 2] = 0.5 * (b[2i + 1] + c[i])$
S4: $a[4i + 3] = t1 * d[2i + 1]$

For the above statements s1-s4, the "a" terms, i.e. $a[4i+0 \ldots 3]$, collectively comprise an "a" array, which is common to all of the statements. Each term that is equal to one of the "a" terms, such as $b[2i+0]$ and $t1*d[2i+0]$, is referred to herein as an "expression". In Table 2, the value of each of the four expressions will be stored into their corresponding location in array "a". Also, if the prior art interleaved data approach, as described above, was used for the statements of Table 2, such approach would detect three aggregated stride-one memory streams $b[2i+0 \ldots 2i+1]$, $c[i]$, and $d[2i+0 \ldots 2i+1]$. The interleaved approach would then scatter the $b[2i+0 \ldots 2i+1]$ and $d[2i+0 \ldots 2i+1]$ stream, without noticing that the $[2i+0 \ldots 2i+1]$ stream is actually used by an isomorphic expression, that is, $t1*d[2i+0]$ in statement s2, and $t1*d[2i+1]$ in statement s4. Accordingly, in order to more efficiently use SLP packing techniques, such as those which make use of semi-isomorphic expressions as defined above, a method is provided herein in accordance with an embodiment of the invention. Such method usefully comprises three steps, illustrated by FIGS. 2A-2D, respectively.

Referring to FIG. 2A, there are shown the statements s1 . . . s4 of Table 2 at box 202. As a first step of the method, depicted at box 204, all expressions of the statements which are to be included in a final output stream, which will be directed to storage positions corresponding to positions of the "a" array, are initially gathered into a single merge stream. Moreover, the merge stream comprises a structure for receiving and storing information associated with each expression that indicates the location of the expression, with respect to the array. That is, for each loop iteration that produces a value of the expression, the location indicates a corresponding array position, and thus indicates the storage position for the value. Thus, a value for the expression $b[2i+0]$ will go in the first element of the aggregated reference $a[4i+0 \ldots 4i+3]$, as defined by statement s1. Therefore, the expression $b[2i+0]$ is associated with array location 0. Similarly, $t1*d[2i+0]$ will go in the second element position of the aggregated reference $a[4i+0 \ldots 4i+3]$, as it is associated with statement s2, which stores into a $a[4i+1]$. The expression $t1*d[2i+0]$ is thus associated with the location 1 in the merge stream. In one embodiment, this association between $b[2i+0]$ and location 0, comprising an expression-location pair, is shown in FIG. 2A at shaded region 206. This relationship is likewise shown in box 204 of FIG. 2A for the expression-location pairs, $t1*d[2i+0]$, [1], $0.5*(b[2i+1]+c[i])$,[2], and $t1*d[2i+1]$,[3]. In one embodiment, the merge stream structure is provided with a mechanism that represents the expression of an expression-location pair as an even element, and represents the location element of the pair as an odd element. In another embodiment, this association between an expression and a location is preserved as a separate structure, such as a hash function or similar mechanism. In this alternative embodiment, only the expressions are stored in the merge stream structure, and, in addition, a separate data structure is used to associate each expression (the key of the hash function) to its corresponding location (the value of the hash function).

Referring to FIG. 2B, box 208 shows the merge stream provided by the first step described above, wherein such merge stream is also depicted at box 204 of FIG. 2A. For the second step of the method, respective expressions are searched to determine whether any of them are semi-isomorphic, or can otherwise be aggregated together by a conventional SLP packing operation. For the statements of Table 2, the expressions t1*d[2i+0] and t1*d[2i+1] are found to be semi-isomorphic, that is, they are isomorphic with respect to each other. They are thus merged into the sub-stream or aggregated expression t1*d[2i+0 . . . 2i+1], as shown by shaded region 212 of box 210, so that they can be scheduled together for processing in accordance with SLP.

As an essential part of the second step, a list or other mechanism that keeps track of the locations of respective expressions is updated, in order to append the location list [1, 3] to the aggregated expression. These locations are derived from the expression t1*d[2i+0] being at position [1] of the "a" array, and t1*d[2i+1] being at position [3] thereof. This location is also shown at shaded region 212 of FIG. 2B.

The third step of the method for the embodiment is to generate code associated with the merge stream structure described above. This task is usefully performed by means of a permute operator, which selectively combines respective expressions into two input vectors, which are then combined into one output vector. This permute operator will eventually correspond to one or more machine instructions that will be executed on the processor in order to merge the two input streams as requested. For example, on machines with VMX SIMD units such as the PowerPC 970, this permute function can be implemented using the "permute" instruction; on the Cell BE SPU, it is implemented by the "shuffle" instruction; other SIMD units have distinct instructions to implement similar functionality. More particularly, unrelated streams of expressions are recursively combined into a single stream or vector, while at the same time keeping track of respective expression locations, until there are only two streams left of equal sizes. Successive recursions are carried out in accordance with a binary tree. Thus, the permute operator initially takes single expressions and combines them into pairs. Two pairs of expressions are then combined. More generally, two input vectors that comprise pairs of expressions with the same number of aggregated elements are combined together during each recursive iteration, each time generating an aggregated vector of twice the size. In the general case, it does not matter which of the two aggregated expressions comes first and second. However, such ordering must be accurately represented by a corresponding position order vector.

The generic permute operator has the following form: Permute(input vector 1, input vector 2, pattern vector). This operator takes two input vectors as inputs, together with a pattern vector. The operator first concatenates or arranges the two input vectors, wherein the order of the elements inside each vector is preserved, and the elements of the second vector are concatenated after each of the elements of the first vector. The permute operator numbers each element in the concatenated vector from 0 to n, and then looks at the pattern vector, which consists of a vector of numbers between 0 and n. The pattern vector is essentially a vector of indices into the concatenated input vectors. For example, if the first number in the vector pattern is 4, the first value in the output corresponds to the entry number 4 in the concatenated vector.

Referring to FIG. 2C, the permute operation described above is further illustrated. At box 214, it is shown that only one pair of expression streams or vectors, each having only one expression, remains after the packing operation described above in connection with FIG. 2B. The two single expressions are b[2i+0] and 0.5*(b[2i+1]+c[i]), depicted at shaded regions 216 and 218, respectively. Each expression is shown together with its array location as an expression-location pair.

Referring to box 220 of FIG. 2C, there is shown the permute operation applied to aggregate the two single expressions into an aggregated expression vector, wherein the expression b[2i+0] comes first in the vector, and the expression 0.5*(b[2i+0]+c[i]) comes second. This ordering is depicted by position order vector 222, comprising [0,1]. The aggregated location vector 226, shown in shaded region 224 of box 220, indicates the array locations [0,2] of the two expressions, in the same order as their corresponding expressions.

Box 228 of FIG. 2C shows the respective expressions of the statements s1-s4 combined into two streams or IP vectors. These vectors comprise the aggregated expression of shaded region 224, and the aggregated expression of shaded region 212, respectively described above. It is to be noted that in a further embodiment, expressions can be gathered or aggregated from more than a single merge stream.

Referring to FIG. 2D, there is shown box 230, wherein the permute operation is applied to the two input vectors of FIG. 2C, in order to combine them into a single output stream. Also, the combined location vector 232 comprising [0,2,1,3], is provided to establish an order in which to acquire successive data values. More specifically, the data associated with array location 0 must be acquired first. Location 0 is at the first position in location vector 232, and thus corresponds to the first expression in the output stream of box 230. This expression is b[2i+0], which therefore must provide data for location 0. Similarly, location 1 of the pattern vector corresponds to the expression t1*d[2i+0]; location 2 corresponds to the expression 0.5*(b[2i+1]+c[i]); and location 3 corresponds to the expression t1*d[2i+1]. This is the order in which respective values must be provided during a loop iteration, for routing data to correct consecutive memory locations, as determined by positions of the "a" array.

Figure 3:
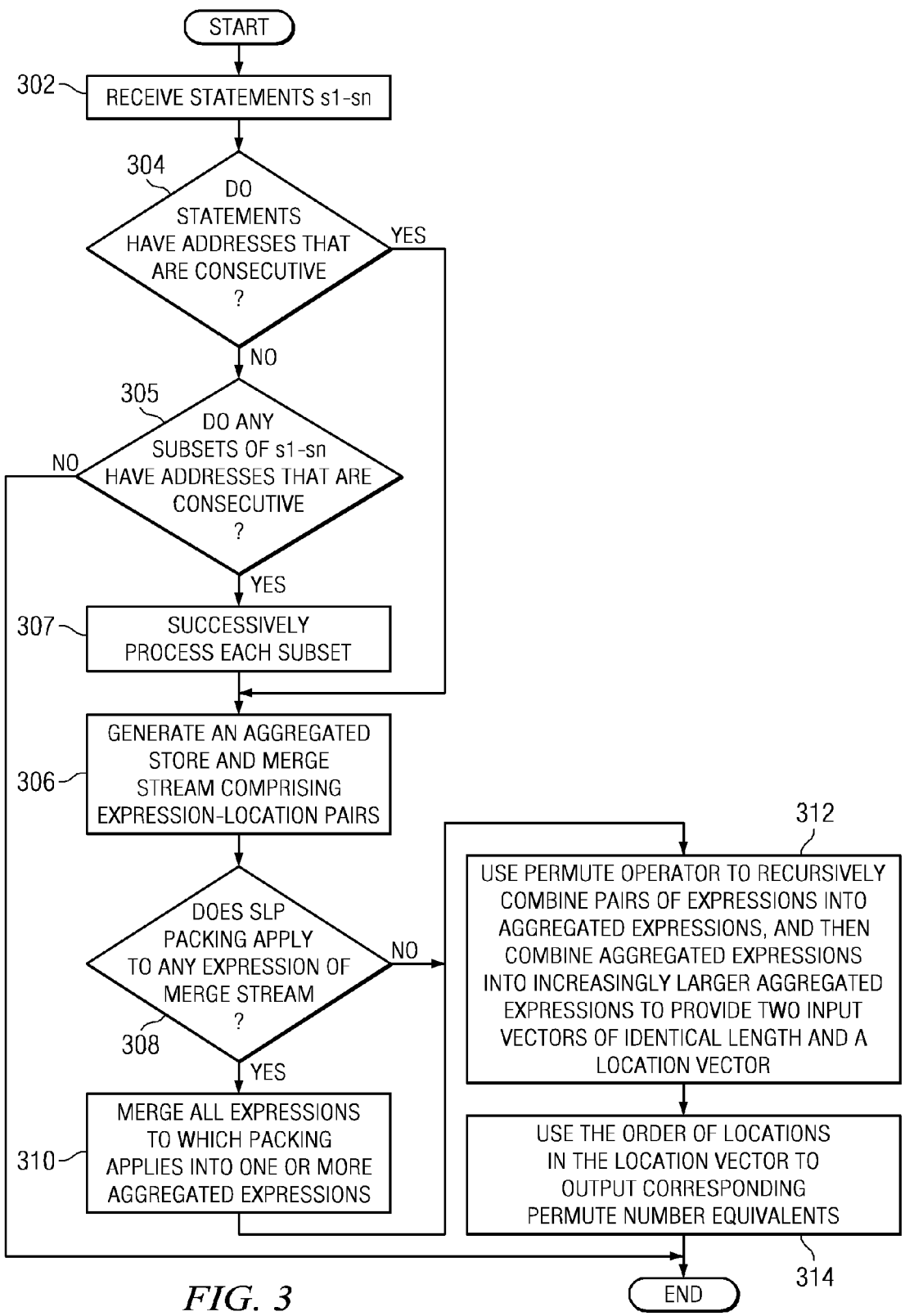
FIG. 3 is a flowchart showing principal steps for an embodiment of the invention.

Referring to FIG. 3, there is shown a flowchart illustrating principal steps of an embodiment of the invention, such as the method described above in connection with FIGS. 2A-2D. At step 302, statements s1-sn are received, such as the statements s1-s4 of Table 2. At step 304, it is necessary to determine whether or not the statements have consecutive memory storage addresses. Statements s1-sn have consecutive addresses if the condition addr(store of sj)=addr(store of s{j−1})+d is true for all statements s1-sn, where d is a constant and $1 \leq i \leq n$. Then, addr(store of s2) is equal to addr(store of s1)+d, and addr(store of sn) is equal to addr(store of s{n−1})+d.

If the statement addresses are found to be non-consecutive, the method of FIG. 3 proceeds to step 305. At this step, an investigation is made to find out if there are any subsets of s1-sn that have consecutive addresses. If there are, step 307 indicates that each of the subsets are successively processed, by routing them to step 306. If no subsets are found at step 305, the method of FIG. 3 ends.

At step 306, the method generates an aggregated store and merge stream. For the statements s1-s4, the aggregated store is represented as addr(store s1) . . . addr(store s4)=a[4i+0 . . . 4i+3], which is equal to the merge stream. The merge stream comprises a stream of expression-location pairs, as described above and as shown at box 204 of FIG. 2A.

At step 308 of FIG. 3, it is necessary to determine whether SLP packing can be applied to any of the expressions of the merge stream. If not, the method bypasses step 310 and proceeds to step 312. Otherwise, step 310 is carried out. This step requires merging respective expressions that can be packed using SLP into one or more aggregated expressions. For example, if the expressions which can be packed are e1,e2 . .

. en and their respective locations are loc1,loc2 ... locn, the expression-location pairs e1/loc1,e2/loc2 ... en/locn are replaced by (e1 ... en), [loc1 ... locn], where (e1 ... en) corresponds to aggregated expressions found by SLP, and [loc1 ... locn] corresponds to the aggregated location vectors corresponding thereto. Step 310 is exemplified by the above description pertaining to FIG. 2B at box 210 and shaded region 212, which shows the expressions t1*d[2i+0] and t1*d[2i+1] packed by an SLP algorithm to form the aggregated vector t1*d[2i+0 ... 1]. The corresponding location vector is [1,3].

At step 312, the permute operator as described above recursively merges pairs of expressions into an aggregated expression or a single interleaved stream, until respective expressions of the initial merge stream have been combined into two input vectors of identical length. This may be carried out, for example, by a permute instruction that directs each expression of an expression pair to go into either a first register or a second register, on an alternating basis. Location vectors of respective merged expressions are also alternated, to provide an ordered list of locations that comprises a combined location vector. The above merging procedure is usefully carried out in accordance with a binary tree.

At step 314, the order of locations in the location vector of step 312 is used to output corresponding permute number equivalents, in order to output the data values that correspond to respective locations. This procedure is further described in connection with FIG. 2D.

Steps 304 and 306 pertain to an algorithm for carrying out the first step of the method described above in connection with statements s1-s4. Similarly, steps 308 and 310 pertain to an algorithm for the second step of such method, and steps 312 and 314 pertain to an algorithm for the third step thereof.

There are typically physical limits to the amount of data that can be permuted by a single SIMD operation. For example, there currently is a limit of 2 input vectors of 16 byte each on the VMX and SPU, but the limit can be larger or smaller on other architectures. Assuming that the limit is V (which is 32 bytes for SPU or VMX), it is necessary to group the data to be found in the output stream by chunks of V bytes, in order to permute more than V bytes. In such cases, it is beneficial to modify the algorithm for Step 3 of the above method (box 310), to take into account this partition when selecting groups of streams to combine.

Consider the case where the output stream gathers N>V bytes of data, and assume that the data size of each element is D. One possible algorithm for performing this task includes partitioning the inputs into ceil(N/V) bins. Bin number 0 is assigned all the elements with location 0 ... V/D−1; in bin number 1, all elements with location V/D ... 2V/D−1; and in bin number x all the elements with locations x*V/D ... (x+1)*V/D−1 are assigned. This may make it necessary to scatter (using permute operations) some of the streams that were SLP merged, if elements that are part of such streams fall into two or more distinct bins. Once the assignment and needed scattering of SLP merged streams is performed, Step 3 of the method can be continued for each of the bins, in turn, and independently of each other. When processing bin number x, only the streams and elements assigned to that bin need to be taken into consideration.

Second, the method is in general not limited to packing expressions found in the same merge stream. The location elements can be extended to include also a unique number (or any equivalent identifier) that also identifies the identity of the destination output stream and modify the algorithm for Step 3. Using the same concept as in the previous paragraph, streams that were packed by SLP and belong to two or more distinct output streams need to be scattered, so as to have sub-streams that include only elements associated with a specific output stream. In such case, step 304 of FIG. 3 is modified to accept multiple sets of statements with consecutive addresses, and steps 310 and 312 are also modified to take the destination packed expression into consideration.

Conversely, if the algorithm does not allow SLP packing in Step 2 of the method, then Step 2 must be constrained to solely searching for packable expressions within a unique output stream.

FIG. 4 illustrates exemplary aspects of a compiler 402. The compiler 402 is a computer program that translates text written in computer language into executable computer code. Referring to FIG. 4, in one embodiment, the compiler 402 is provided in the storage such as hard disk drive 102 of FIG. 1. A SIMD architecture 404 and a simdizer 406 are respectively provided in the compiler 402. The simdizer 406 generates instructions for the SIMD architecture 404. The compiler 402 instructions ar executed by the processors 102 of FIG. 1.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using Superword-Level Parallelism (SLP) in processing a plurality of statements, wherein the statements are associated with an array having a number of array positions, and each statement includes one or more expressions, the computer implemented method comprising the steps of:
gathering, by one or more computer processors, isomorphic and non-isomorphic expressions for each of the statements into a merge stream of mixed isomorphic and non-isomorphic expressions, the merge stream being furnished with a location for each gathered isomorphic expression and each gathered non-isomorphic expression, wherein the location for a given expression is associated with one of the positions of the array;
selectively identifying, by the one or more computer processors, one or more sets of expressions in the merge stream that are aggregatable by a SLP packing operation, and applying the SLP packing operation to the identified one or more sets of expressions in order to merge the identified one or more sets of expressions into one or more isomorphic sub-streams;
selectively combining, by the one or more computer processors, the expressions of the one or more isomorphic sub-streams, and other non-isomorphic expressions of the merge stream, into a number of input vectors that are substantially equal in length to one another;
generating, by the one or more computer processors, a location vector containing the respective locations for all of the isomorphic and non-isomorphic expressions in the merge stream;
generating, by the one or more computer processors, an output stream comprising the expressions of the number of input vectors, wherein said expressions are arranged in an order in the output stream that is determined by the respective locations contained in the location vector; and
preserving, by the one or more computer processors, at least one location vector or a set of location vectors at each step during processing.

2. The computer implemented method of claim 1, wherein: the positions of the array respectively correspond to positions in a set of consecutive storage positions of a memory device.

3. The computer implemented method of claim 1, wherein: each identified expression comprises a semi-isomorphic expression, wherein two of the semi-isomorphic expressions are merged together by an SLP packing operation in order to provide one of the isomorphic sub-streams.

4. The computer implemented method of claim 1, wherein: the combining step is carried out by a permute operator that recursively aggregates streams of expressions, wherein a given recursion comprises aggregating expression streams that each contain a given number of expressions, in order to generate an aggregated stream comprising twice the given number of expressions.

5. The computer implemented method of claim 4, wherein: one or more lists containing locations of respective expressions are maintained and updated, as respective streams of expressions are recursively combined.

6. The computer implemented method of claim 4, wherein: generation of a given one of the aggregated expression streams is accompanied by generation of a location stream, wherein the location stream contains the location of all the expressions in the given expression streams, arranged in a same order as their respectively corresponding expressions.

7. The computer implemented method of claim 4, wherein: the expression streams are recursively combined in accordance with a binary tree procedure.

8. The computer implemented method of claim 1, wherein: at least some of the expressions are initially gathered into the merge stream, in an order determined by the order of the positions of the array, and any remaining expressions are gathered into one or more other merge streams.

9. The computer implemented method of claim 1, wherein: the number of the input vectors, and a maximum data capacity of respective vectors, are selected to comply with requirements of a specified data processing device, and data found in the output stream is selectively grouped, to further comply with said requirements.

10. The computer implemented method of claim 9, wherein:
there are two of the input vectors, each limited to a data capacity comprising a specified byte size.

11. The method of claim 1, wherein the steps are performed using recursion and the length of each input vector in each successive recursive iteration of the steps is twice a size of a prior iteration.

12. The method of claim 1, wherein the one or more sets of expressions in the merge stream that are aggregatable by the SLP packing operation comprise expressions that are isomorphic or semi-isomorphic with respect to each other.

13. A computer program product executable in a non-transitory computer readable storage medium for using Superword-Level Parallelism (SLP) in processing a plurality of statements, wherein the statements are associated with an array having a number of array positions, and each statement includes one or more expressions, the computer program product comprising:
instructions for gathering isomorphic and non-isomorphic expressions for each of the statements into a merge stream of mixed isomorphic and non-isomorphic expressions, the merge stream being furnished with a location for each gathered isomorphic expression and each gathered non-isomorphic expression, wherein the location for a given expression is associated with one of the positions of the array;
instructions for selectively identifying one or more sets of expressions in the merge stream that are aggregatable by a SLP packing operation, and applying SLP packing operation to the identified one or more sets of expressions in order to merge the identified one or more sets of expressions into one or more isomorphic sub-streams;
instructions for selectively combining the expressions of the one or more isomorphic sub-streams, and other non-isomorphic expressions of the merge stream, into a number of input vectors that are substantially equal in length to one another;
instructions for generating a location vector containing the respective locations for all of the isomorphic and non-isomorphic expressions in the merge stream;
instructions for generating an output stream comprising the expressions of the number of input vectors, wherein the expressions are arranged in the output stream in an order that is determined by the respective locations contained in the location vector; and
instructions for preserving at least one location vector or a set of location vectors at each step during processing.

14. The computer program product of claim 13, wherein: the positions of the array respectively correspond to positions in a set of consecutive storage positions of a memory device.

15. The computer program product of claim 13, wherein: each identified expression comprises a semi-isomorphic expression, wherein two of the semi-isomorphic expressions are merged together by an SLP packing operation in order to provide one of the isomorphic sub-streams.

16. The computer program product of claim 13, wherein: the expressions are combined by a permute operator that recursively aggregates streams of expressions, wherein a given recursion comprises aggregating expression streams that each contain a given number of expressions, in order to generate an aggregated stream comprising twice the given number of expressions.

17. The computer program product of claim 16, wherein: generation of a given one of the aggregated expression streams is accompanied by generation of a location stream, wherein the location stream contains the location of all the expressions in the given expression streams, arranged in a same order as their respectively corresponding expressions.

18. The computer program product of claim 13, wherein the steps are performed using recursion and the length of each input vector in each successive recursive iteration of the steps is twice a size of a prior iteration.

19. The computer program product of claim 13, wherein the one or more sets of expressions in the merge stream that are aggregatable by the SLP packing operation comprise expressions that are isomorphic or semi-isomorphic with respect to each other.

20. A computer system adapted to use Superword-Level Parallelism (SLP) in processing a plurality of statements, wherein the statements are associated with an array having a number of array positions, and each statement includes one or more expressions, the system comprising the steps of:
   a first component of the computer system configured for gathering isomorphic and non-isomorphic expressions for each of the statements into a merge stream of mixed isomorphic and non-isomorphic expressions, the merge stream being furnished with a location for each gathered isomorphic expression and each gathered non-isomorphic expression, wherein the location for a given expression is associated with one of the positions of the array;
   a second component of the computer system configured for selectively identifying one or more sets of expressions in the merge stream that are aggregatable by a SLP packing operation, and applying SLP packing operations to the identified one or more sets of expressions in order to merge the identified one or more sets of expressions into one or more isomorphic sub-streams;
   a third component of the computer system configured for selectively combining the expressions of the one or more isomorphic sub-streams, and other non-isomorphic expressions of the merge stream, into a number of input vectors that are substantially equal in length to one another;
   a fourth component of the computer system configured for generating a location vector containing the respective locations for all of the isomorphic and non-isomorphic expressions in the merge stream;
   a fifth component of the computer system configured for generating an output stream comprising the expressions of the number of input vectors, wherein the expressions are arranged in the output stream in an order in the output stream that is determined by the respective locations contained in the location vector; and
   a sixth component of the computer system configured for preserving at least one location vector or a set of location vectors at each step during processing.

21. The system of claim 20, wherein: the positions of the array respectively correspond to positions in a set of consecutive storage positions of a memory device.

22. The system of claim 20, wherein: each identified expression comprises a semi-isomorphic expression, wherein two of the semi-isomorphic expressions are merged together by an SLP packing operation in order to provide one of the isomorphic sub-streams.

23. The system of claim 20, wherein: the third component combines the expressions by means of a permute operator that recursively aggregates streams of expressions, wherein a given recursion comprises aggregating expression streams that each contain a given number of expressions, in order to generate an aggregated stream comprising twice the given number of expressions.

24. The system of claim 23, wherein: generation of a given one of the aggregated expression streams is accompanied by generation of a location stream, wherein the location stream contains the location of all the expressions in the given expression streams, arranged in a same order as their respectively corresponding expressions.

25. The system of claim 20, wherein the steps are performed using recursion and the length of each input vector in each successive recursive iteration of the steps is twice a size of a prior iteration.

26. The system of claim 20, wherein the one or more sets of expressions in the merge stream that are aggregatable by the SLP packing operation comprise expressions that are isomorphic or semi-isomorphic with respect to each other.

* * * * *